(12) United States Patent
Ksiezopolki et al.

(10) Patent No.: US 6,966,590 B1
(45) Date of Patent: Nov. 22, 2005

(54) TWO-PART SEAL FOR A SLIDE-OUT ROOM

(76) Inventors: Edwin E. Ksiezopolki, 16067 Covington Pkwy., Granger, IN (US) 46530; Norman L. Newhouse, II, 16067 Covington Pkwy., Granger, IN (US) 46530

( * ) Notice: Subject to any disclaimer, the term of this patent is extended or adjusted under 35 U.S.C. 154(b) by 2 days.

(21) Appl. No.: 10/712,937

(22) Filed: Nov. 13, 2003

Related U.S. Application Data

(60) Provisional application No. 60/469,773, filed on May 12, 2003.

(51) Int. Cl.[7] .............................. B60P 3/34; E06B 7/16
(52) U.S. Cl. .............................. 296/26.01; 296/26.12; 296/165; 52/67; 49/475.1; 49/482.1; 49/493.1; 49/495.1; 49/498.1
(58) Field of Search ................. 296/26.01, 26.08, 296/26.09, 26.12, 26.13, 165, 171, 175, 93, 296/146.9, 154; 52/67; 277/648; 49/475.1, 49/482.1, 493.1, 495.1, 498.1

(56) References Cited

U.S. PATENT DOCUMENTS

| | | | |
|---|---|---|---|
| 3,719,386 A | | 3/1973 | Puckett et al. |
| 4,361,348 A | | 11/1982 | Rapp et al. |
| 4,448,430 A | * | 5/1984 | Bright .......................... 277/642 |
| 4,549,761 A | * | 10/1985 | Lee et al. ................... 296/206 |
| 4,955,661 A | * | 9/1990 | Mattice ....................... 296/171 |
| 5,237,782 A | * | 8/1993 | Cooper .......................... 52/67 |
| 5,785,373 A | * | 7/1998 | Futrell et al. ............ 296/26.01 |
| 5,788,306 A | | 8/1998 | DiBiagio et al. |
| 5,791,715 A | | 8/1998 | Nebel |
| 5,894,698 A | | 4/1999 | Dewald, Jr. et al. |
| 6,007,142 A | * | 12/1999 | Gehman et al. ............ 296/171 |
| 6,048,016 A | | 4/2000 | Futrell et al. |
| 6,094,870 A | | 8/2000 | Stacy |
| 6,108,983 A | * | 8/2000 | Dewald et al. ................. 52/67 |
| 6,152,516 A | | 11/2000 | Williams |
| 6,224,126 B1 | | 5/2001 | Martin et al. |
| 6,401,398 B1 | | 6/2002 | Panayides et al. |
| 6,428,073 B1 | | 8/2002 | Blodgett, Jr. |
| 6,527,324 B2 | | 3/2003 | McManus et al. |
| 6,572,170 B2 | * | 6/2003 | McManus et al. ....... 296/26.13 |
| 6,619,726 B2 | * | 9/2003 | Jones ......................... 296/163 |
| 2002/0078634 A1 | | 6/2002 | McManus et al. |
| 2002/0089213 A1 | * | 7/2002 | Gehman et al. ............ 296/171 |

FOREIGN PATENT DOCUMENTS

| | | |
|---|---|---|
| WO | PCT WO 99/33683 | 7/1999 |
| WO | PCT WO 02/30705 | 4/2002 |

* cited by examiner

*Primary Examiner*—Dennis H. Pedder
*Assistant Examiner*—Greg Blankenship

(57) ABSTRACT

A resilient seal is mountable around the edge of an opening in a sidewall of a mobile living quarters through which a slide-out room travels. The seal includes two parts that slide together—a mounting portion and a-bulb seal portion—with the bulb seal portion being compressed when the slide-out room is closed. A wiper seal portion extending from the mounting portion is for contacting the adjacent wall of the slide-out room.

6 Claims, 2 Drawing Sheets

TWO-PART SEAL FOR A SLIDE-OUT ROOM

This Application claims the benefit of provisional U.S. Patent Application No. 60/469,773, filed 12 May 2003.

FIELD OF THE INVENTION

The invention disclosed herein relates to a seal, and more particularly, a seal usable with a slide-out room in mobile living quarters.

BACKGROUND OF THE INVENTION

Resilient seals are often placed along the abutting edges of parts, and one such application is found in the field of mobile living quarters having slide-out rooms. A seal is commonly placed along the interface between the slide-out room and the opening in the sidewall of the mobile living quarters to prevent water, debris, and excessive air drafts from entering the interior of the mobile living quarters from the outside. This seal often includes two sub-parts, a bulb seal and a wiper seal, each extending along a side of the opening. The bulb seal is usually placed on either the exterior edge of the sidewall or the interior edge of a flange portion of the slide-out room wall to form a resilient seal between the sidewall and the flange portion of the slide-out room when the room is closed. A separate wiper seal is usually placed along the edge of the sidewall and flexibly protrudes against the adjacent sidewall of the slide-out room so as to be in constant contact with the sidewall at all positions of the room between its open and closed positions. A typical example of such an arrangement can be seen in U.S. Patent Application Publication No. U.S. 2002/0078634 A1, published Jun. 27, 2002. A problem with this type of seal arrangement is that the bulb seal and wiper seal must be mounted separately.

Another known seal arrangement used for the slide-out room includes a pair of bulb seals on opposite sides of a mounting portion, and a wiper seal protruding from an adjacent side of the mounting portion between the bulb seals, as disclosed in U.S. Pat. No. 6,048,016. The mounting portion is mounted to the edge of the sidewall of the mobile living quarters between the two opposite sides with a clip such that the wiper seal maintains flexible contact with the sidewall of the slide-out room. The two bulb portions contact one of two flange portions at either end of the slide-out room at both its open and closed positions to create a seal. This arrangement, however, may not be suitable for easy adaptation to be installed on different slide-out room configurations due to its unitary construction. Another problem is that, after long usage, the seal may disengage from the clip and fall off. If the seal falls off the clip, it can be difficult to access the clip for reinstalling the seal without taking the slide out room completely out of the wall.

Therefore, it would be desirable to have a multi-piece room seal that can be easily adapted for installation on different room configurations. It would also be desirable for the seal to be easily assembled on the exterior of the sidewall during installation to provide a single seal portion providing both a wiper seal for wiping against the sidewall of the slide-out room and a bulb seal for contacting the flange around the outside edge of the slide-out room when it is closed.

SUMMARY OF THE INVENTION

The invention disclosed herein includes a resilient seal for use with a slide-out room in a mobile living quarters. The seal includes a mounting portion for mounting to a first wall. A bulb seal portion is snap-fitable to the mounting portion. The bulb seal portion extends from the mounting portion for contact with a second wall when the second wall is adjacent the first wall. A wiper seal portion for continuous resilient contact with a third wall spaced from the first wall may be carried by the mounting portion.

One object of the invention is to provide a seal including a bulb seal portion and a wiper seal portion that may be easily adapted for installation on different slide-out room configurations. Another object of the invention is to provide a seal that can be easily assembled and installed around a slide-out room in a mobile living quarters to form a single seal apparatus between the slide-out room and the wall of the mobile living quarters.

BRIEF DESCRIPTION OF THE DRAWINGS

These and other aspects of the invention will be apparent from the following description, with reference to the accompanying drawings, in which.

DETAILED DESCRIPTION

Figure 1:
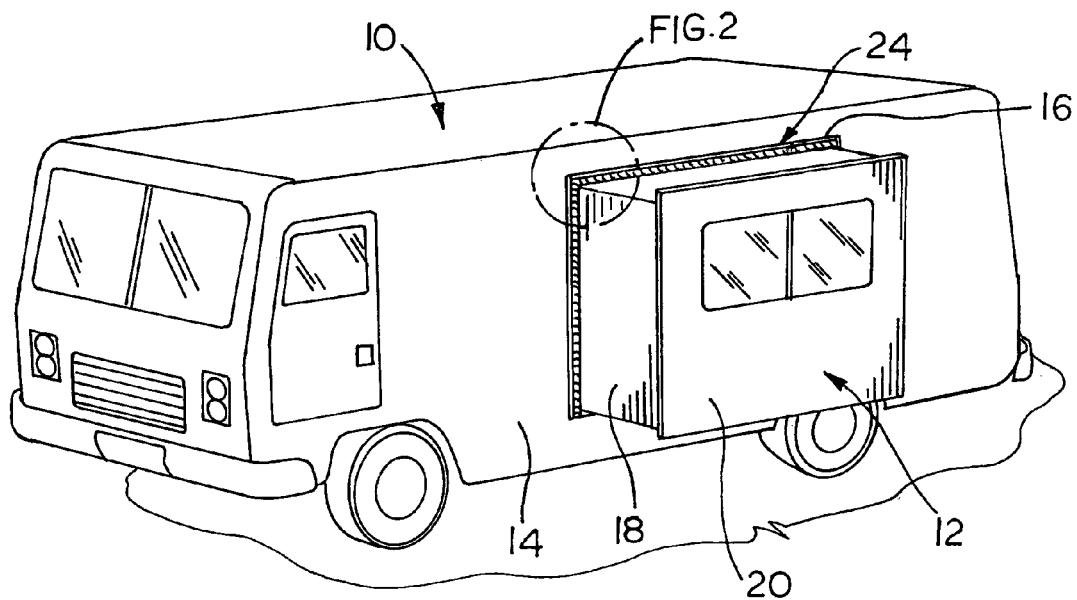
FIG. 1 shows a mobile living quarters with a slide-out room in an extended position surrounded by the seal of this invention.
Figure 2:
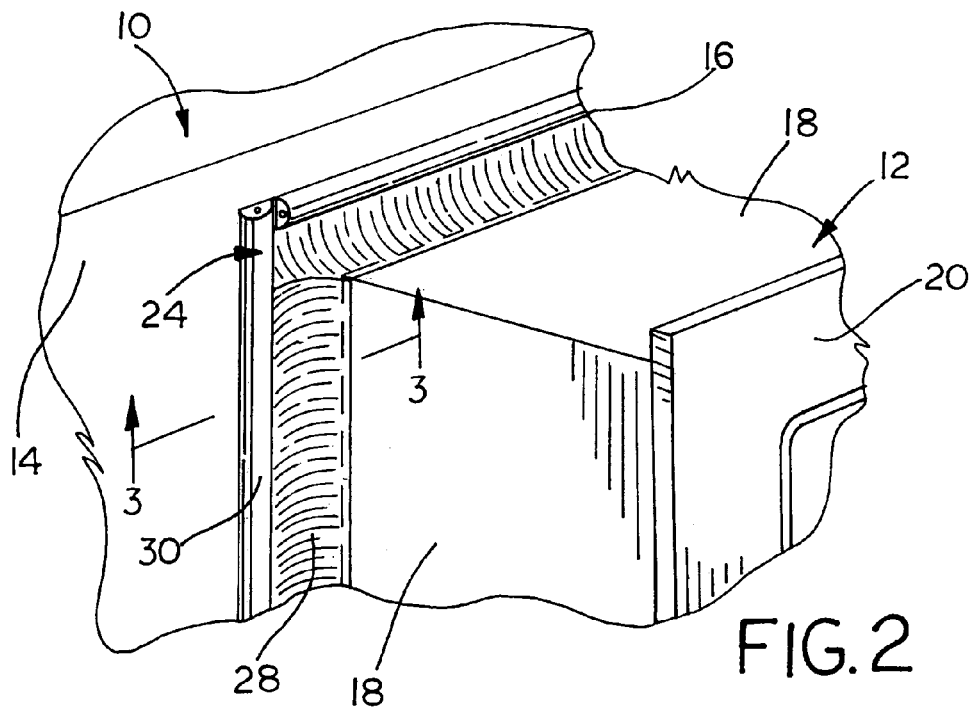
FIG. 2 is a fragmentary detail perspective view of the room and seal of FIG. 1.
Figure 3:
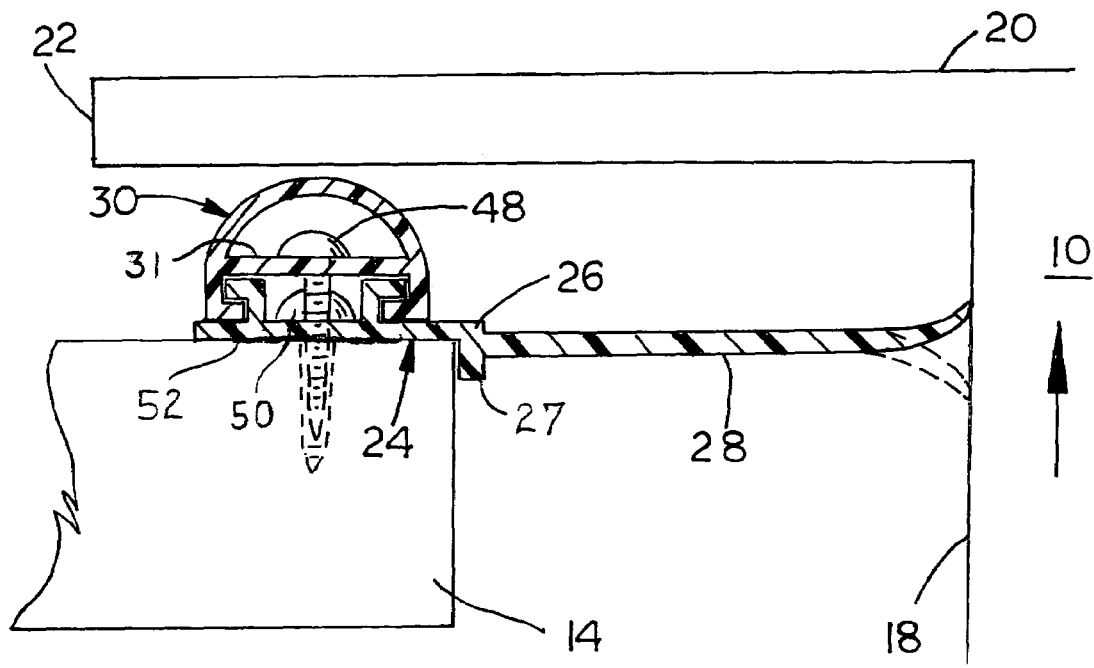
FIG. 3 is a fragmentary cross sectional view as seen along line 3—3 in FIG. 2; and, FIG. 4 is a detailed cross section of the resilient seal parts separated from each other.
Figure 4:
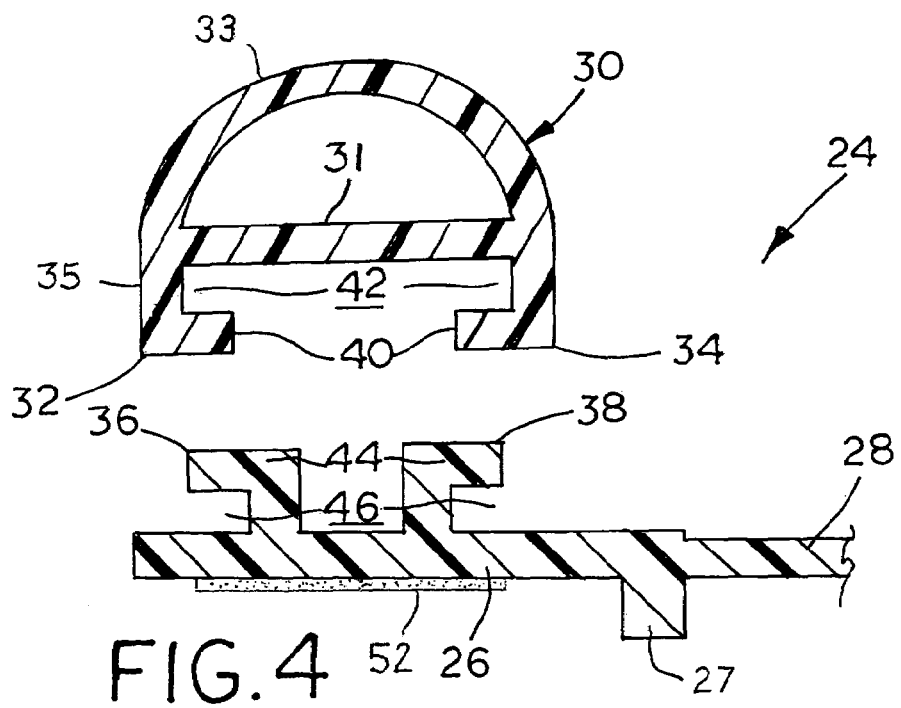

Referring now to the drawings, a mobile living quarters 10, such as a recreational vehicle, is shown having a slide-out room 12. Mobile living quarters 10 includes a sidewall 14 having an opening 16 through which slide-out room 12 shifts. Slide-out room 12 is of well known form including an interior space generally defined by four sidewalls 18 and an end wall 20. Slide-out room 12 fits through opening 16 and extends perpendicular to sidewall 14 such that its end wall 20 is adjacent the sidewall of the mobile living quarters when the slide-out room is retracted and spaced from the sidewall when the slide-out room is extended. A flange 22 extends outwardly from the peripheral edge of end wall 20 of the slide-out room to overlap with sidewall 14 of the mobile living quarters when slide-out room 12 is retracted.

A resilient seal 24 is located along the periphery of opening 16 to prevent dirt, water, and other materials from passing from the exterior of the mobile living quarters 10 to its interior. Seal 24 may be made of any sufficiently resilient material such as thermoplastic elastomer. Seal 24 includes a generally flat mounting portion, or clip portion 26 with a lip 27 fitted about the edge of sidewall 14 and a wiper seal portion 28 protruding transversely from the mounting portion toward sidewall 18 of the slide-out room. Wiper seal portion 28 is a flexible, generally planar section with its distal end opposite mounting portion 26 in resilient contact with sidewall 18 such that the wiper seal is flexed against the sidewall to maintain an effective seal with the sidewall at all times during extension or retraction of the slide-out room. Seal 24 further includes a bulb seal portion 30 having a bulb part 33 and a clip part 35 which is slidably connected or snap-fitted to mounting portion 26.

Mounting portion 26 includes oppositely extending, rail-like tabs 36, 38 which form a tongue 44 separated from the body of the mounting portion by a groove 46. Clip part 35 of bulb seal portion 30 includes tabs 32, 34 which form a groove 42 defined in part by opposing flanges 40. When mounting portion 26 and clip part 35 are connected together, tongues 44 fits into grooves 42. Tabs 32, 34, 36, 38 all extend lengthwise along seal 24 such that, once fitted together, bulb seal portion 30 may be slid along the length of mounting portion 26, and are flexible enough to allow them to snap past each other for assembly. Alternatively, clip part 35 of bulb seal portion 30 may be slid into mounting portion 26 from an end of the seal 24. Preferably, seal 24 is constructed such that mounting portion 26 is more rigid than wiper portion 28, and such that web 31 and tabs 32, 34 are more rigid than bulb part 33.

To install seal 24 onto the mobile living quarters about opening 16, pressure tape 52 having adhesive on both sides is applied to the exterior side of sidewall 14 along the edge of the opening where mounting portion 26 is to be attached. Mounting portion 26 is then located along the exterior edge of opening 16 in the sidewall 14 of the mobile living quarters by abutting lip 27 against the edge of the opening with tabs 36, 38 extending outwardly from the exterior side of sidewall 14 and wiper seal portion 28 extending toward sidewall 18 of the slide-out room. Next, pressure is applied to mounting portion 26 to press the mounting portion against pressure tape 52 to adhere the mounting portion to the sidewall. Fasteners 50 are then inserted through mounting portion 26 into sidewall 14 to firmly secure the mounting portion to the sidewall. Fasteners 50 are preferably screws driven through mounting portion 26 in the space between tabs 36, 38 so as to be hidden behind bulb seal portion 30 when in its mounted position. Next, clip part 35 of bulb seal portion 30 is mounted to mounting portion 26 by either snap fitting grooves 42 about tongues 44 or sliding the bulb seal portion at its groove about the tongue of the mounting portion from one end of the mounting portion. Bulb seal portion 30 is then adjusted in location along mounting portion 26 by sliding the bulb seal portion along the mated tongue 44 and groove 42 connection to its desired final location relative mounting portion 26. Bulb seal portion 30 may be secured in its final position along mounting portion 26 by placing a fastener 48, preferably a screw, at an angle through only the internal web 31 of the bulb seal portion and the mounting portion near the end of the seal section. Fastener 48 preferably does not penetrate the bulb part 33 of bulb seal 30 in order to maintain a better seal with room flange 22. Bulb seal portion 30 may be subsequently replaced by removing fasteners 48 and installing a new section of bulb seal portion without having to replace the wiper portion.

Seal 24 may be easily adapted to fit to different slide-out room configurations by cutting any necessary length. A variety of different corner configurations in the opening 16 may be easily adapted to by cutting the bulb seal portion 30 to a different length than the mounting portion 26, and the wiper seal portion 28 may be cut to a third length if necessary. A variety of different gaps between the mobile living quarter's sidewall 14 and the slide-out room sidewalls 18 may be easily adapted to by adjusting the lateral position of the mounting portion 26 relative the sidewall 14 or trimming back the wiper seal portion 28. By mounting the mounting portion 26 and the bulb seal portion 30 to the exterior side of sidewall 14, subsequent repair and replacement of worn seal parts may be easily performed without having to remove the slide out room 12 from the opening 16 in wall 14.

The detailed description related herein is only meant to exemplify the preferred embodiment of the invention to enable those skilled in the art to make and use it. The subject invention is not to be limited to the details given above for the preferred embodiment, but may be modified within the scope of the impending claims.

We claim:

1. A resilient seal used in combination with a mobile living quarters having a slide-out room defining an interior space, said mobile living quarters comprising a first sidewall having an exterior side, said first sidewall defining an opening through which said slide-out room is shifted between open and closed positions relative the first sidewall, said slide-out room including a second sidewall spaced from said first sidewall and an end wall defining said interior space, said end wall including a peripheral flange overlapping said first sidewall when said slide-out room is in its said closed position, said seal comprising a mounting portion attached to said first sidewall along said opening and a separate bulb portion, said bulb portion slidably connected to said mounting portion for compessible contact with said flange of said exterior wall when said slide-out room is in its said closed position.

2. The seal and mobile living quarters of claim 1 including a tongue connector carried by one of said mounting portion and said bulb portion and a groove connector carried by the other of said mounting portion and said bulb portion for releasably facilitating the connection of said bulb portion to said mounting portion.

3. The seal and mobile living quarters of claim 1 wherein said seal includes a wiper portion extending from said mounting portion toward said second sidewall, said wiper portion maintaining resilient contact with said second sidewall as said slide-out room shifts between said open and closed positions.

4. The seal and mobile living quarters of claim 3, and a fastener through said mounting portion for attaching said mounting portion to said first sidewall, an adhesive between said mounting portion and said first sidewall, said fastener covered by said bulb portion.

5. The seal and mobile living quarters of claim 4, and said mounting portion attached to said exterior side of said first sidewall.

6. A method of attaching a seal to a mobile living quarters having a slide-out room, said mobile living quarters including a first sidewall defining an opening through which said slide-out room shifted between open and closed positions relative the first sidewall, said slide-out room defined by a second sidewall and an end wall, said end wall including a peripheral flange overlapping said first sidewall when said slide-out room is in its said closed position, said seal including an elongated mounting portion and an elongated bulb seal portion, said method comprising the steps:

a) affixing said mounting portion to said first wall adjacent said opening using both adhesive and mechanical fasteners;

b) attaching said bulb seal portion so as to locate the bulb portion in compressed engagement with and between said first sidewall and said flange when said slide-out room is in its said closed position;

c) sliding said bulb seal along said attached mounting to a selected position; and, d) maintaining said selected position of said bulb seal portion to said mounting portion by fastening the bulb seal portion to the mounting portion.

* * * * *